United States Patent [19]

Moriyasu et al.

[11] Patent Number: 4,721,080
[45] Date of Patent: Jan. 26, 1988

[54] STRUCTURE OF COMBUSTION CHAMBER IN DIESEL ENGINE

[75] Inventors: Takeshi Moriyasu, Joyo; Jun Isomoto; Tatsuro Nakagami, both of Kyoto; Hiroo Takahashi, Mukoo; Takuo Maeda, Kyoto, all of Japan

[73] Assignee: Mitsubishi Jidosha Kogyo Kabushiki Kaisha, Tokyo, Japan

[21] Appl. No.: 787,794

[22] PCT Filed: Feb. 14, 1985

[86] PCT No.: PCT/JP85/00058

§ 371 Date: Oct. 3, 1985

§ 102(e) Date: Oct. 3, 1985

[87] PCT Pub. No.: WO85/03738

PCT Pub. Date: Aug. 29, 1985

[30] Foreign Application Priority Data

Feb. 15, 1984 [JP] Japan .................. 59-26857
May 28, 1984 [JP] Japan .................. 59-78531
Sep. 22, 1984 [JP] Japan .................. 59-143997
Feb. 7, 1985 [JP] Japan .................. 60-20819

[51] Int. Cl.⁴ ........................................ F02B 19/08
[52] U.S. Cl. ............................. 123/276; 123/279; 123/256
[58] Field of Search .............. 123/276, 279, 193 P, 123/193 R, 256

[56] References Cited

U.S. PATENT DOCUMENTS

| | | | |
|---|---|---|---|
| 2,762,348 | 9/1956 | Meurer | 123/279 |
| 2,881,743 | 4/1959 | Holt | 123/276 |
| 2,975,773 | 3/1961 | Meurer | 123/276 |
| 3,083,700 | 4/1963 | Madak et al. | 123/276 |
| 4,207,843 | 6/1980 | List et al. | 123/276 |
| 4,473,046 | 9/1984 | Aoyama et al. | 123/276 |
| 4,538,566 | 9/1985 | Tsuruoka | 123/279 |

Primary Examiner—Craig R. Feinberg
Attorney, Agent, or Firm—Bruce L. Adams; Van C. Wilks

[57] ABSTRACT

In a combustion chamber structure in a direct injection type diesel engine, in order to prevent flames from flowing out to a quench zone Q from a combustion chamber (32) which opens to a top part (30a) of a piston (30) to thereby prevent cooling of the flames and also in order to prevent a fuel spray from being concentrated on a lower portion of the combustion chamber (32), the fuel spray should be reflected in the combustion chamber (32) effectively according to displacement of the piston (30) to allow it to be mixed with air sufficiently in the combustion chamber (32) or in a cylinder (28), and to this end there are provided a guide wall (34) which becomes larger in inside diameter downwardly from an opening edge portion (33) of the combustion chamber (32), as well as fuel reflection walls (36, 38) which project below the guide wall (34) toward a central axis (lo) of the combustion chamber (32) and divide the combustion chamber vertically into a first combustion chamber (44) and a second combustion chamber (48).

44 Claims, 32 Drawing Figures

STRUCTURE OF COMBUSTION CHAMBER IN DIESEL ENGINE

FIELD OF ART

The present invention relates to a structure of a combustion chamber in direct injection type diesel engine.

BACKGROUND ART

Heretofore, in order to promote a complete combustion particularly at a low load in a small-sized direct injection type diesel engine, there has often been used a so-called re-entrant type combustion chamber in which, as shown in FIG. 1, a side wall 4a of a combustion chamber 4 which opens to a top 2a of a piston 2 is inclined divergently toward the interior of the piston 2.

More particularly, during a diffused combustion at the time of descent of the piston 2, it is very likely that flames ejected from the interior of the combustion chamber 4 to near the peripheral wall of a cylinder will contact an air layer Q (generally called a quench zone; hereinafter referred to also as "quench zone") of a relatively low temperature located near the peripheral wall of the cylinder and also contact a cylinder wall of a low temperature and will be cooled thereby, resulting in a complete combustion being not effected and carbon particles in the flames remaining unburnt, thus causing inconveniences such as an increased concentration of discharged smoke and a decreased output. To eliminate these inconveniences, the side wall 4a of the combustion chamber 4 is inclined as shown in FIG. 1 to prevent flames from entering the quench zone Q.

In such a re-entrant type combustion chamber, however, fuel spray from an injection nozzle 6 is easily concentrated on a lower portion of the combustion chamber 4 due to the inclination of the side wall 4a of the chamber 4 as shown in FIG. 1, thus causing a partial reduction of air utilization factor. As a result, the effect of reducing the concentration of discharged smoke is not attained to a satisfactory extent.

In such a re-entrant type combustion chamber, in order to disperse the fuel spray in an upper area within the combustion chamber 4, as shown in FIG. 2, it is necessary that the injection nozzle 6 is projected largely into the combustion chamber 4 to widen the injection angle $\theta$ to distribute the fuel spray after impingement against the wall surface also to an upper portion of the combustion chamber. However, as the amount of projection of the injection nozzle 6 increases, the temperature of the nozzle tip becomes more elevated, thus causing seizure of a valve seat face of the nozzle and a valve.

In the above re-entrant type combustion chamber, moreover, when the amount of fuel spray is large in a state of high load, the fuel spray is difficult to spurt out of the combustion chamber, thus causing shortage of air, reduction of output and increased concentration of discharged smoke.

In an effort to overcome the problem of air shortage at a high load, there has been proposed such a combustion chamber 8 as shown in FIG. 3 whose opening edge portion 10 is not throttled, namely, a so-called open type combustion chamber, whereby it is intended to let the fuel from the injection nozzle 6 flow out also to the cylinder portion outside the combustion chamber 8 in addition to the interior of the same chamber and to thereby utilize the air at the cylinder portion positively. In such an open type combustion chamber, however, combustion gas will strike on the quench zone Q from the combustion chamber 8 at a low load and thereby cooled to increase the amount of black smoke. For these reasons, in a small-sized direct injection type diesel engine, it has heretofore been difficult to obtain a combustion chamber capable of covering all conditions from high to low loads.

DISCLOSURE OF THE INVENTION

The present invention intends to eliminate the above inconveniences. It is the object thereof to provide a structure of a combustion chamber in a small-sized direct injection type diesel engine having a displacement of about 300 cc to about 800 cc per cylinder not permitting complete evaporation and burning of fuel from a fuel injection nozzle before reaching a side wall of the combustion chamber, in which the fuel spray is reflected in the combustion chamber effectively according to the displacement of a piston throughout the overall range from low to high engine loads and the fuel spray is controlled so as to be mixed with air throughly in the combustion chamber or in the cylinder, thereby compensating for the shortage of air, reducing the concentration of discharged smoke, improving the output and eventually attaining economy in fuel consumption.

More specifically, the present invention provides a combustion chamber structure in a direct injection type diesel engine having a cylinder block 20, a cylinder head 22 disposed above the cylinder block 20, a piston 30 fitted in a cylinder 28 of the cylinder block 20, a combustion chamber 32 which is formed as a recess in a top part 30a of the piston 30 and whose upper surface is opposed to the cylinder head 22, and a fuel injection nozzle 26 disposed in the cylinder head 22 for injecting fuel into the combustion chamber 32, characterized in that the combustion chamber 32 is formed in the shape of a geometrical rotating body; that the combustion chamber 32 has a side wall 32a and this side wall 32a comprises a guide wall 34 which becomes larger in inside diameter downwardly from an opening edge portion 33 of the combustion chamber 32, a first fuel reflection wall 36 formed below the guide wall 34 so that it becomes smaller in inside diameter downwardly, a second fuel reflection wall 38 formed below the first fuel reflection wall 36 approximately in parallel with a central axis lo of the combustion chamber 32 and a lower side wall 48a formed below the second fuel reflection wall 38, having a concavely curved shape at its upper portion and connected at its lower portion to a bottom 32b of the combustion chamber 32; that the combustion chamber 32 is composed of a first combustion chamber 44 surrounded by the guide wall 34, the first fuel reflection wall 36 and the second fuel reflection wall 38 and a second combustion chamber 48 formed below the first combustion chamber 44 and surrounded by the lower side wall 48a; and that spout orifices of the injection nozzle 26 are disposed so that in a top dead-center position of the piston 30, the fuel spray from the nozzle 26 is directed to a junction 42 between the first and second combustion chambers 44 and 48.

Moreover, the present invention provides a combustion chamber structure in a direct injection type diesel engine having a cylinder block 20, a cylinder head 22 disposed above the cylinder block 20, a piston 60 fitted in a cylinder 28 of the cylinder block 20, a combustion chamber 32 which is formed as a recess in a top part 60a of the piston 60 and whose upper surface is opposed to the cylinder head 22, and a fuel injection nozzle 26 disposed in the cylinder head 22 for injecting fuel into the combustion chamber 32, characterized in that the combustion chamber 62 has a side wall which comprises a first side wall portion 62a and a second side wall portion 62a'; the side wall portions 62a and 62a' being arranged alternately by the same number as the number of spout orifices of the fuel injection nozzle 63 and being different in sectional shape from each other, said first side wall portion 62a comprising a first guide wall 64 which becomes larger in inside diameter downwardly from an opening edge portion 61 of the combustion chamber 62, a first fuel reflection wall 66 formed below the first guide wall 64 so that it becomes smaller in inside diameter downwardly, a second fuel reflection wall 68 formed below the first fuel reflection wall 66 approximately in parallel with a central axis lo of the combustion chamber 62 and a lower side wall 78a formed below the second fuel reflection wall 68, having a concavely curved shape at its upper portion and connected at its lower portion to a bottom 62b of the combustion chamber 62, said second side wall portion 62a' comprising a second guide wall 65 which becomes larger in inside diameter downwardly from an opening edge portion 61' of the combustion chamber 62 at an inclination smaller than that of the first guide wall 64, a third fuel reflection wall 66' formed below the second guide wall 65 so that it becomes smaller in inside diameter at an inclination almost equal to that of the first fuel reflection wall 66, a fourth fuel reflection wall 68' formed below the third fuel reflection wall 66' approximately in parallel with the central axis lo of the combustion chamber 62 and a second lower side wall 78a' formed below the fourth fuel reflection wall 68', having a concavely curved shape at its upper portion and connected at its lower portion to the bottom 62b of the combustion chamber 62, the combustion chamber 62 comprising a first combustion chamber 74 which is surrounded by the first and second guide walls 64 and 65 and the first to fourth fuel reflection walls 66, 68, 66' and 68' and a second combustion chamber 78 which is formed below the first combustion chamber 74 and which is surrounded by the first and second lower side walls 78a and 78a'; and that spout orifices of the fuel injection nozzle 63 are disposed so that in a top dead-center position of the piston 60, the fuel spray from the nozzle 63 is directed toward a junction 72 between the first and second combustion chambers 74, 78 at the first side wall portion 62a and a junction 72' between the first and second combustion chambers 74, 78 at the second side wall portion 62a'.

Further, the present invention provides a combustion chamber structure in a direct injection type diesel engine having a cylinder block 20, a cylinder head 22 disposed above the cylinder block 20, a piston 100 fitted in a cylinder 28 of the cylinder block 20, a combustion chamber 102 which is formed as a recess in a top part 100a of the piston 100 and whose upper surface is opposed to the cylinder head 22, and a fuel injection nozzle 124 disposed in the cylinder head 22 for injecting fuel spray into the combustion chamber 102, characterized in that the combustion chamber 102 has a side wall 102a and this side wall 102a comprises a guide wall 104 which becomes larger in inside diameter downwardly from an opening edge portion 101 of the combustion chamber 102 and a fuel reflecting wall portion 106 formed below the quide wall 104 and projecting toward a central axis lo of the combustion chamber 102, the combustion chamber being divided by the fuel reflecting wall portion 106 vertically into a first combustion chamber 108 and a second combustion chamber 110, and the fuel reflecting wall portion 106 comprising a first inclined portion 120 which is inclined in a vertical direction and a second inclined portion 122 which is inclined in a direction opposite to the first inclined portion 120, the first and second inclined portions 120 and 122 being arranged alternately along the circumference of the combustion chamber 102.

According to the construction of the present invention, spout orifices are disposed so that in a top dead-center position of a piston, fuel spray is directed toward the junction between the first and second combustion chambers. Further, in an engine having a displacement of 300 cc to 800 cc per cylinder to which the present invention is to be applied, a piston is positioned approximately near its top dead center when fuel spray injected from a fuel injection nozzle into a combustion chamber reaches the side wall of the combustion chamber at a low engine load.

Consequently, in a state of low load, a main flow $A_1$ of injected fuel strikes against the second fuel reflection wall from the junction of the first and second combustion chambers. Thereafter, the main flow $A_1$ of injected fuel flows down along the second fuel reflection wall, then goes away at the junction from the side wall of the second combustion chamber and produces a fuel flow $B_1$ which flows downward in the second combustion chamber along a vertical rotating flow of air occurring in the same chamber. The fuel flow $B_1$ is mixed with the air in the second combustion chamber and an air layer $E_1$ is formed between the fuel flow $B_1$ and the side wall of the second combustion chamber. Consequently, the fuel flow $B_1$ is surrounded with a sufficient amount of air without being cooled by the side wall because of the presence of the air layer $E_1'$ and an extremely good combustion of the fuel flow $B_1$ is thereby attained. Moreover, there will not occur an overconcentration of fuel at the lower portion of the second combustion chamber and thus the generation of black smoke can be prevented. Further, an upwardly flowing fuel or flame is prevented from directly entering into the quench zone Q by the guide wall, whereby the concentration of discharged smoke can be decreased.

Under a medium load condition of the engine, when a piston is descending, another fuel spray operation is added to the above operation in the combustion chamber. In this lowered state of the piston, a relative distance between the fuel injection nozzle and the combustion chamber becomes longer than in the above state of low load, so fuel spray $A_2$ from the fuel injection nozzle strikes mainly against the second fuel reflection wall and a second bent connection between the second and first fuel reflection walls. Since the second fuel reflection wall is formed approximately in parallel with the central axis lo, the main flow of fuel reflected by the second fuel reflection wall becomes a fuel flow $B_2$ which flows toward the center of the second combustion chamber.

Therefore, the fuel flow $B_2$ flows above the fuel flow $B_1$, forming an air layer $E_2$ between the fuel flows $B_2$ and $B_1$. Thus, in the second combustion chamber there are formed layers of air layer $E_1$, fuel flow $B_1$, air layer $E_2$ and fuel layer $B_2$, and the mixing of fuel with air is effected satisfactorily together with the swirl and vertical rotating flow in the combustion chamber, whereby the concentration of combustion smoke discharged can be decreased.

Further, under the high load condition of the engine, when the piston further descends, further fuel spray is added to the above state in the combustion chamber. In a more lowered state of the piston than its position explained in the above medium load condition, a main fuel flow $A_3$ from the fuel injection nozzle strikes mainly against the first fuel reflection wall and a first connection between the first fuel reflection wall and the guide wall. The main fuel flow reflected by the first fuel reflection wall flows toward an upper central part of the second combustion chamber, forming a fuel flow $B_3$.

The fuel flow $B_3$ flows more upward than the flowing directions of the fuel flows $B_1$ and $B_2$, allowing an air layer $E_3$ to be formed between the fuel flows $B_3$ and $B_2$. Thus, in the second combustion chamber there are formed layers of air layer $E_1$, fuel flow $B_1$, air layer $E_2$, fuel flow $B_2$, air layer $E_3$ and fuel flow $B_3$, and the mixing of fuel with air is effected extremely satisfactorily together with the vertical rotating flow and swirl of air in the second combustion chamber, whereby the concentration of combustion smoke discharged can be decreased.

Moreover, flame or fuel is allowed to flow out into the upper cylinder space along the guide wall and thus the air in the cylinder can be utilized effectively to compensate for the shortage of air in a high load operation.

Further, over all the range from low to high load conditions, sprayed fuel does not concentrate on the lower portion of the combustion chamber but is dispersed throughout the combustion chamber, so the amount of projection, $\delta$, of the fuel injection nozzle from the lower surface of the cylinder head can be made small. Accordingly, the tip end portion of the nozzle is prevented from being exposed to elevated temperatures.

BEST FORM FOR PRACTISING THE INVENTION

Construction as well as function and effect of first embodiment will be explained hereinunder with reference to FIGS. 4 to 15.

A direct injection type diesel engine disclosed in this embodiment is a small-sized diesel engine having a displacement of 300 cc to 800 cc per cylinder in which fuel injected from a fuel injection nozzle does not evaporate and burn completely before it strikes against the side wall of a combustion chamber.

Figure 1:
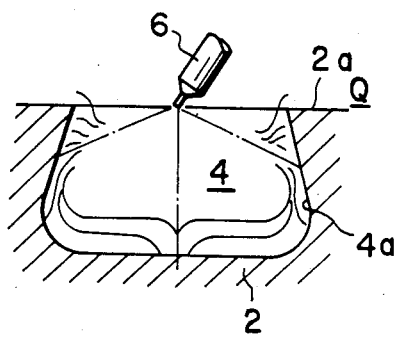
FIGS. 1, 2 and 3 are longitudinal sectional views showing shapes of conventional combustion chambers.
Figure 2:
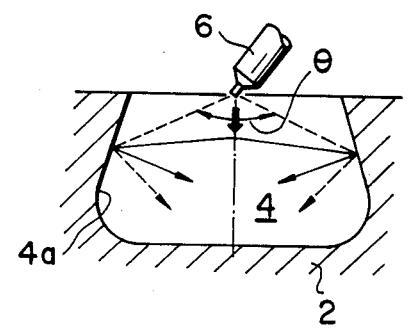
Figure 3:
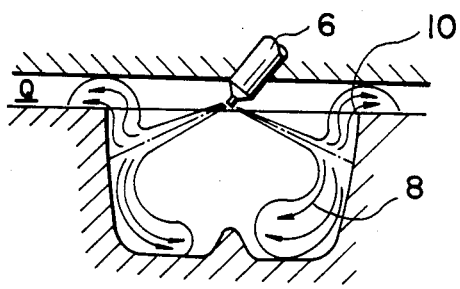
Figure 4:
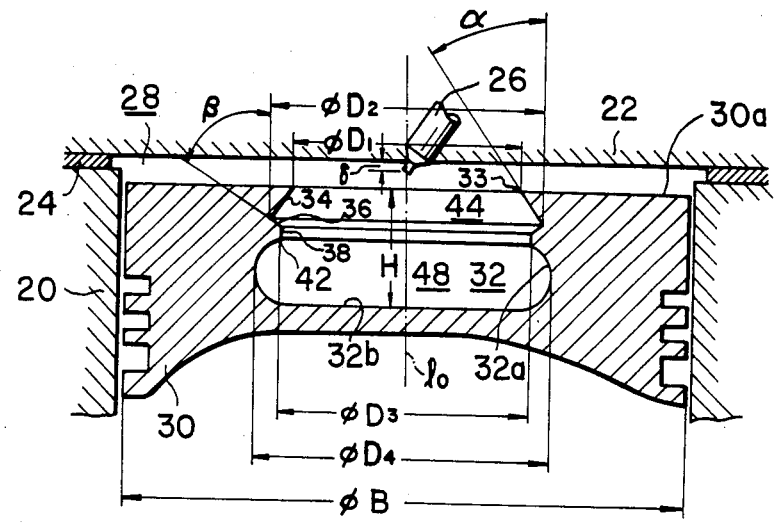
FIGS. 4 and 5 are longitudinal sectional views showing a first embodiment of the present invention.
Figure 5:
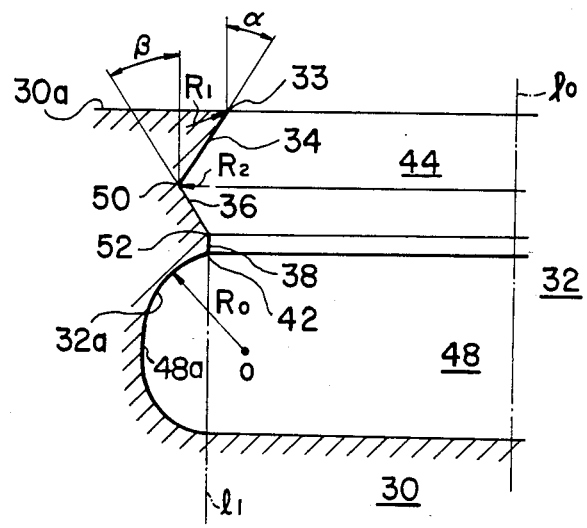

In the longitudinal sectional views of FIGS. 4 and 5, the reference numeral 20 denotes a cylinder block and the numeral 22 denotes a cylinder head disposed above the cylinder block 20 through a gasket 24. In the cylinder head 22 is disposed a fuel injection nozzle (hereinafter referred to as "injection nozzle") 26.

A cylinder 28 is formed by the cylinder block 20 and the cylinder head 22. A cylindrical piston 30 is mounted to undergo reciprocatory movement in the cylinder 28 and a combustion chamber 32 having an opening is formed as a recess or cavity in a top part (top face) 30a of the piston 30. A side or inner wall 32a of the combustion chamber 32 is formed in the shape of a geometrical rotating body around a centered axis lo.

As shown in FIG. 5, the side wall 32a comprises a guide wall or upper sub-section 34 which becomes larger in inside diameter downwardly from a top opening edge portion or section 33, a first fuel reflection wall or lower sub-section 36 connected below the guide wall 34 through a first connection or border section 50 and formed so that its inside diameter becomes smaller downwardly, and a second fuel reflection wall or intermediate section 38 connected below the first fuel reflection wall 36 through a second connection 52 and formed approximately in parallel with the central axis lo. A first combustion chamber 44 is constituted surroundingly by the guide wall 34, first fuel reflection wall 36 and second fuel reflection wall 38.

Thus, the guide wall or upper sub-section 34 and the first fuel reflection wall or lower sub-section 36, those constituting a upper section tapering radially and outwardly, are formed in the shape of a side face of a truncated cone, and the second fuel reflection wall 38 is formed in the shape of a side face of a column.

Below the second fuel reflection wall 38, a lower side wall or lower section 48a extends upwardly from a bottom section 32b of the combustion chamber 32 through an edge portion 42 and curves radially outwardly as will be described later. The upper half of the lower side wall 48a is formed in the shape of an arc of radius Ro centered around the point O shown in FIG. 5. A second combustion chamber 48 is formed surroundingly by the lower side wall 48a and it is positioned below the first combustion chamber 44. Further, a junction 42 between a lower end of the second fuel reflection wall 38 which is in the form of a straight line and an upper end on the arc of the lower side wall 48a, is formed as a bent edge portion 42. The guide wall 34 and the first fuel reflection wall 36 are constituted so that the inclination angle $\alpha$ of the guide wall 34 relative to the central axis lo and the inclination angle $\beta$ of the first fuel reflection wall 36 relative to the same axis are each 30°.

The opening edge portion 33 of the first combustion chamber 44 is formed to have an arcuate shape of radius $R_1$ which is 0.5 mm, and the first connection 50 is formed to have an arcuate shape of radius $R_2$ which is 0.5 mm.

Further, the radius $R_0$ of the upper portion of the lower side wall 48a of the second combustion chamber 48 is arranged so that the center O is positioned closer to the central axis lo than a straight line l1 which is parallel with the central axis lo and which passes through the edge portion 42. And radius $R_0$ is set at 4.5 mm.

Diameter B of the piston 30, diameter $D_1$ of the opening edge portion 33 located at an upper part of the first combustion chamber 44, diameter (maximum diameter of the first combustion chamber 44) $D_2$ of the first connection 50 between the guide wall 34 and the first fuel reflection wall 36, diameter $D_3$ of the edge portion 42, diameter $D_4$ of the second combustion chamber 48 and height or depth H of the combustion chamber 32, are set as follows.

Ratio of the maximum diameter $D_2$ of the first combustion chamber 44 to the maximum diameter $D_4$ of the second combustion chamber 48: $D_2/D_4=0.96$ Ratio of the inside diameter $D_3$ of the edge portion 42 to the maximum diameter $D_4$ of the second combustion chamber 48: $D_3/D_4=0.92$ Ratio of the upper opening diameter $D_1$ of the first combustion chamber 44 to the maximum diameter $D_4$ of the second combustion chamber 48: $D_1/D_4=0.86$ Ratio of the maximum diameter $D_4$ of the second combustion chamber 48 to the piston diameter B: $D_4/B=0.54$ Ratio of the height H of the combustion chamber 32 to the maximum diameter $D_4$ of the second combustion chamber 48: $H/D_4=0.35$ Thus, there exists the relation of $D_1 \leq D_3 \leq D_2 \leq D_4$.

Figure 6:
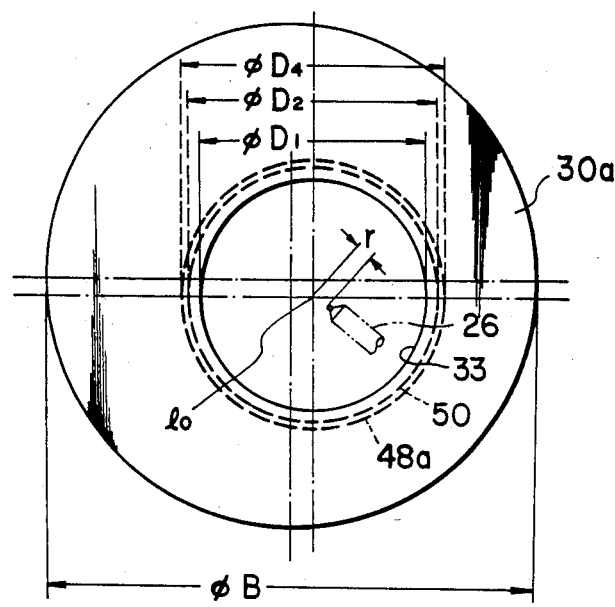
FIG. 6 is a plan view of the first embodiment.

Further, as shown in FIGS. 4 and 6, the distance, r, between the central axis lo of the combustion chamber 32 and the center of the tip end portion of the injection nozzle 26 is set at 1.0 mm and the amount of projection, $\delta$, of the nozzle 26 from the lower surface of the cylinder head 22 is set at 2.5 mm.

In the above construction of this embodiment, during compression stroke of the engine, the piston 30 rises within the cylinder 28 and reaches its top dead center.

Figure 7:
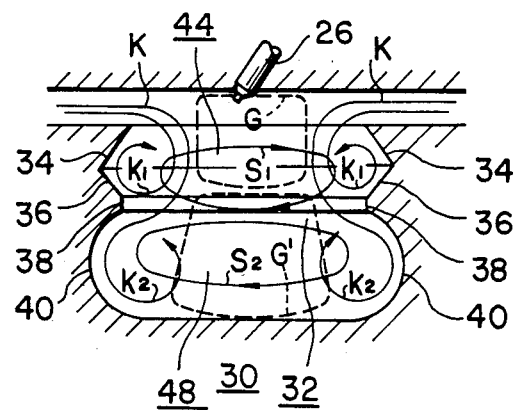
FIGS. 7, 8(a), 8(b) and 8(c) are explanatory views of fuel and air flows in the first embodiment.

The flow of air in the vicinity of the top dead center will now be considered. As shown in FIG. 7, there occurs a squish K strongly from the circumference of the combustion chamber 32 toward the interior thereof. Since the squish K tries to concentrate toward the center of the combustion chamber 32, a high pressure portion G is created at the center. The squish k moving downward after striking against the high pressure portion G is guided by the first fuel reflection wall 36 and guide wall 34 and creates a vertical rotating flow $K_1$ in the first combustion chamber 44. At the same time, the portion under the high pressure portion G also becomes higher in pressure than the surrounding combustion chamber portion and forms a quasi-high pressure portion G'. Consequently, the flow of the squish K to the second combustion chamber 48 goes down between the vertical rotating flow $K_1$ and the high pressure portion G and is then forced out to the peripheral wall portion of the combustion chamber 32 by the quasi-high pressure portion G' to create such a vertical rotating flow $K_2$ as shown in FIG. 7. In this way, the vertical rotating flows $K_1$ and $K_2$ are created by the squish K.

In the combustion chamber 32, moreover, swirls $S_1$ and $S_2$ are created in addition to the squish K and vertical rotating flows $K_1$ and $K_2$, and these air flows are mixed, so that the combustion chamber 32 is filled with compressed air.

In the above state of air in the combustion chamber 32, when fuel jet is injected from the fuel injection nozzle 26 into the combustion chamber 32, and when the piston 30 is in the vicinity of the top-dead-center or topmost position, a main flow $A_1$ of injected fuel strikes against the portion extending from the edge portion 42 to the second fuel reflection wall 38. Thereafter, the main flow of injection fuel flows downward along the second fuel reflection wall 38, then at the edge portion 42 it goes away from the lower side wall 48a of the second combustion chamber 48, and flows as a fuel flow $B_1$ shown in FIG. 8(a) along the vertical rotating air flow $K_2$ and is mixed with the compressed air in the second combustion chamber 48.

An air layer $E_1$ is formed between the fuel flow $B_1$ and the lower side wall 48a of the second combustion chamber 48. Because of the presence of this air layer $E_1$, the fuel flow $B_1$ is prevented from being cooled by the lower side wall 48a and is surrounded with ample air, so that the fuel flow $B_1$ is mixed with air and burns.

Figure 8A:
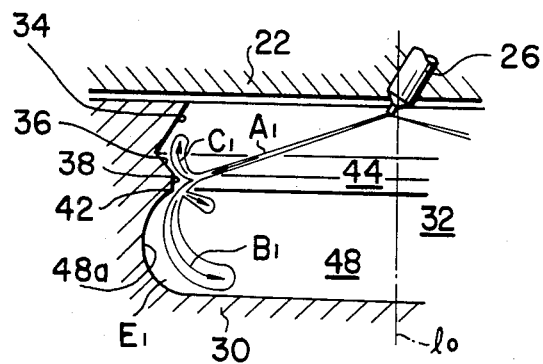

Part of the fuel reflected by the second fuel reflection wall 38 rises along the second and first fuel reflection walls 38 and 36 as shown in FIG. 8(a) and creates a fuel flow $C_1$. The fuel flow $C_1$ is also mixed fully with air by the air flow of the vertical rotating flow $K_1$ in the first combustion chamber 44 so that the fuel in the fuel flow $C_1$ burns.

Figure 8B:
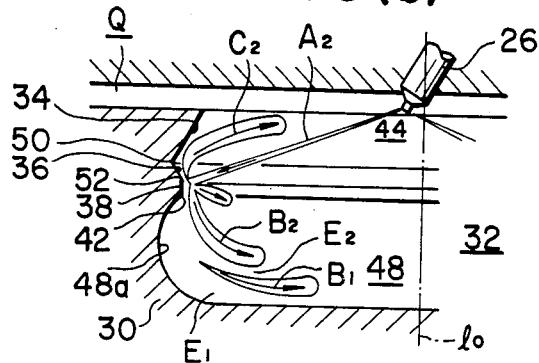

In a slightly lowered state of the piston 30 from its top dead center as shown in FIG. 8(b), a main flow $A_2$ of the fuel injected from the injection nozzle 26 strikes mainly against the portion extending from the second fuel reflection wall 38 to the second connection 52 (a bent portion between the second fuel reflection wall 38 and the first fuel reflection wall 36). The main flow of fuel reflected by the second fuel reflection wall 38 flows through the high pressure portion G in the direction of $B_2$ in the figure toward the center of the second combustion chamber 48.

Therefore, the fuel flow $B_2$ is more upward than the fuel flow $B_1$ explained in connection with FIG. 8(a), thereby creating an air layer $E_2$ between the fuel flows $B_2$ and $B_1$.

Thus, in the second combustion chamber 48, there are formed the air layer $E_1$, fuel flow $B_1$, air layer $E_2$ and fuel flow $B_2$ successively from the bottom 32b of the combustion chamber 32 toward the opening edge portion 33, and the mixing of fuel with air is effected sufficiently together with the swirl $S_2$ and vertical rotating flow $K_2$, causing the fuel to burn.

On the other hand, some part of the main flow $A_2$ of fuel reflected by the first fuel reflection wall 36 moves as a flow $C_2$ in the figure through the high pressure portion G toward the center of the first combustion chamber 44 and is mixed with air and burns.

Thus, in both the first and second combustion chambers 44 and 48, the fuel-air mixing is effected sufficiently. Fuel or flame flowing out from the combustion chamber 32 toward the space between the upper portion 30a of the piston 30 and the cylinder head 22 is directed upward toward the portion above the combustion chamber 32 by the guide wall 34.

Figure 8C:
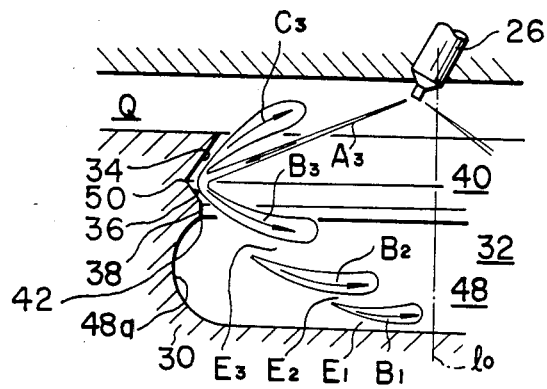

As the piston 30 further descends, as shown in FIG. 8(c), a main flow $A_3$ of fuel injected from the injection nozzle 26 strikes mainly against the portion from the first fuel reflection wall 36 to the first connection 50 between the first fuel reflection wall 36 and the guide wall 34, whereupon the main flow reflected by the first fuel reflection wall 36 flows through the quasi-high pressure portion G' toward an upper central portion of the second combustion chamber 48 as indicated by the fuel flow $B_3$ in the figure. This fuel flow $B_3$ moves more upward than the fuel flow $B_2$ explained in connection with FIG. 8(b), thereby causing an air layer $E_3$ to be present between the fuel flow $B_3$ and the fuel flow $B_2$. Thus, in the second combustion chamber 48, there are formed the air layer $E_1$, fuel flow $B_1$, air layer $E_2$, fuel flow $B_2$, air layer $E_3$ and fuel flow $B_3$ successively from the bottom 32b of the combustion chamber 32 toward the opening edge portion 33. Further, the mixing of fuel with air is effected to an extremely satisfactory extent together with the air flows of vertical rotating flow $K_2$ and swirl $S_2$, whereby the concentration of combustion smoke discharged can be decreased.

On the other hand, the fuel reflected toward the guide wall 34 flows along the guide wall 34 in the direction of $C_3$ in the figure toward the portion above the combustion chamber 32. The fuel flow $C_3$ is mixed with the air existing between the piston 30 and the cylinder head 22 and burns.

The following description is now provided about the case where the amount of fuel sprayed (spraying time) varies with change of load, with respect to each of low, medium and high loads.

Explanation will be made first about the state of low load in which fuel is sprayed from the fuel injection nozzle 26 in the state of FIG. 8(a) and the fuel spraying is completed before entering the state of FIG. 8(b). The fuel spray is fully mixed with air due to the presence of the air layer $E_1$ between the lower side wall 48a of the second combustion chamber 48 and the fuel flow $B_1$ and the presence of the vertical rotating flow $K_2$ and swirl $S_2$ in the second combustion chamber 48, and combustion is effected within the combustion chamber 32.

In the state of medium load in which fuel is sprayed from the state of FIG. 8(a) to the state of FIG. 8(b) and the fuel spraying is completed before entering the state of FIG. 8(c), there are formed in the second combustion chamber 48, the air layer $E_1$, fuel flow $B_1$, air layer $E_2$ and fuel flow $B_2$, and in the first combustion chamber 44, the fuel flow $C_2$ flows toward the center of the same chamber, so that the mixing is effected by the action of the vertical rotating flows $K_1$, $K_2$ and swirls $S_1$, $S_2$ throughout the combustion chamber 32 and the air in the chamber 32 is used fully.

Further, in the state of high load in which fuel is sprayed during the piston movement shown in FIG. 8(a) to FIG. 8(c), there are created fuel flows $C_1$, $C_2$ and $C_3$ within the first combustion chamber 44, while in the second combustion chamber 48, there are formed air layer $E_1$, main fuel flow $B_1$, air layer $E_2$, fuel flow $B_2$, air layer $E_3$ and fuel flow $B_3$, and in cooperation with the vertical rotating flows $K_1$, $K_2$ and swirls $S_1$, $S_2$, the air and fuel in the combustion chamber 32 are fully mixed and burn.

Thus, according to this embodiment, in a low load operation of the engine, the fuel is prevented from adhering to and thereby being cooled by the side wall of the combustion chamber 32, particularly to the lower side wall 48a of the second combustion chamber 48, and there is no fear of fuel being concentrated on the lower portion of the second combustion chamber 48 and forming an overconcentrated portion, thus making it possible to prevent the generation of black smoke. Besides, the upwardly flowing fuel or flame is prevented from directly entering the quench zone Q by the guide wall 34, whereby the concentration of discharged smoke can be decreased.

In a high load operation of the engine, flame or fuel is directed along the guide wall 34 to the space above the combustion chamber 32 and it does not flow out directly to the quench zone Q, and therefore, it is not cooled by the quench zone. Thus, the intake air can be used effectively to compensate for the shortage of air.

Further, due to the presence of the first fuel reflection wall 36 and the edge portion 42, the sprayed fuel is dispersed throughout the combustion chamber 32 without being concentrated on the lower portion of the chamber, so the amount of projection δ of the fuel injection nozzle 26 from the lower surface of the cylinder head 22 can be made small, whereby the tip end portion of the nozzle 26 is prevented from being exposed to elevated temperatures.

In the construction of this embodiment, moreover, in longitudinal section as shown in FIG. 5, the opening edge portion 33 of the combustion chamber 32 is formed to have an arcuate shape of radius $R_1$ and the first connection 50 is formed to have an arcuate shape of radius $R_2$, both $R_1$ and $R_2$ being 0.5 mm, so there is no fear of the opening edge portion 33 and the first connection 50 being cracked by the elevated temperature in the combustion chamber 32.

Further, the inventors have conducted experiments while changing variously the angles $\alpha$ and $\beta$, arcs of radii $R_1$ and $R_2$, diameter $D_1$ of the upper opening edge portion 33 of the first combustion chamber 44, maximum diameter $D_2$ of the first combustion chamber 44, diameter $D_3$ of the edge portion 42, maximum diameter $D_4$ of the second combustion chamber 48, diameter B of the piston 30, height H of the combustion 32 and the distance r between the central position of the combustion chamber 32 and that of the injection nozzle 26, and using a number of direct injection type diesel engines having displacements in the range of 400 cc to 500 cc per cylinder and compression ratios in the range of 18 to 19, to obtain the following results. In this experiment, the engine speed and the concentration of discharged smoke are kept constant and in this state the output was measured for each parameter.

In FIGS. 9 to 14, the ratio of each measured value to the maximum value in the measurement result is shown as an output ratio for each parameter; that is, the ratio to the maximum output is shown for each parameter.

According to the present inventors' experiments, at outputs not less than 95% of the maximum output, the drop of output in the engine operation has little influence, so there have been selected those in the range of 95% to 100% in terms of an output ratio to the maximum output value for each parameter.

The following explanation is now provided with respect to each parameter with reference to FIGS. 9 to 14.

Figure 9:
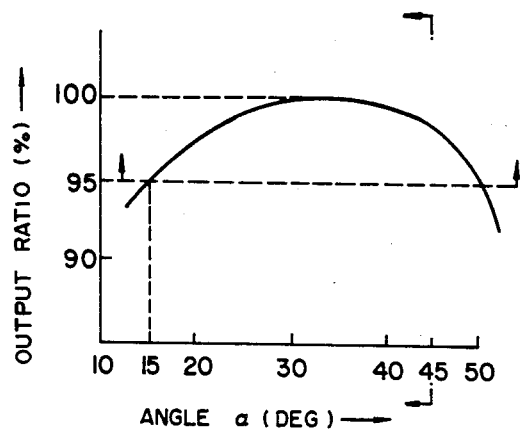
FIGS. 9 to 14 are graphs showing experimental results based on the first embodiment.

First, as to the angle $\alpha$ between the central axis lo of the combustion chamber 32 and the guide wall 34, a maximum output can be obtained at $30° \leq \alpha \leq 40°$, and 95% to 100% of the maximum output can be obtained at $15° \leq \alpha \leq 50°$, as shown in FIG. 9. If the value of angle $\alpha$ is taken too large, the upper opening edge portion 33 of the first combustion chamber 44 becomes too sharp and so its heat resistance is deteriorated, while at a value smaller than 15° the output ratio becomes lower than 95%, and thus such values are not desirable. According to the experimental results, $15° \leq \alpha \leq 45°$ is suitable.

Figure 10:
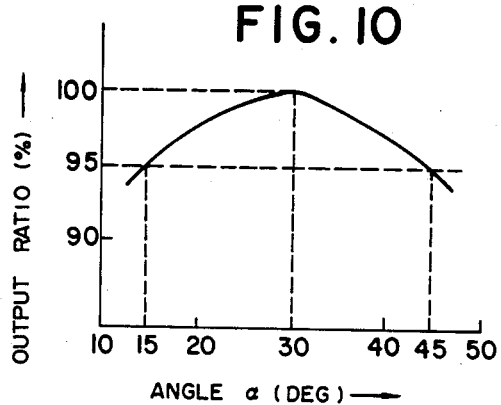

As to the angle β between the central axis lo of the combustion chamber 32 and the first fuel reflection wall 36, a maximum output can be obtained at β=30°, and 95% to 100% of the maximum output can be obtained at 15°≦α≦45°, which angular range is desirable, as shown in FIG. 10.

Figure 11:
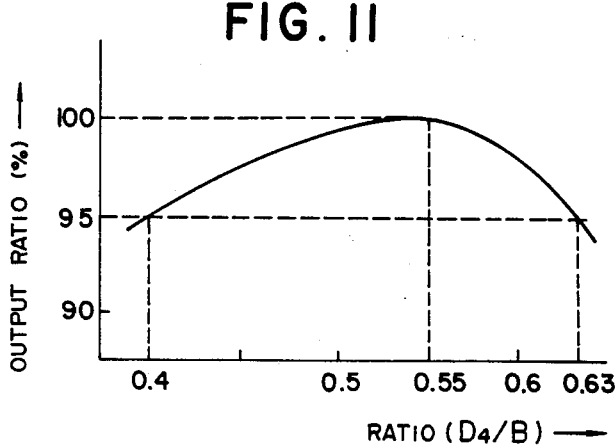

As to the relation between the ratio ($D_4$/B) of the maximum diameter $D_4$ of the second combustion chamber 48 to the outside diameter B of the piston and the output ratio, a maximum output is obtained when ($D_4$/B) is 0.55, and 95% to 100% of the maximum output is obtained at 0.4≦($D_4$/B)≦0.6, as shown in FIG. 11. Therefore, the range of 0.4≦($D_4$/B)≦0.6 is considered suitable.

Figure 12:
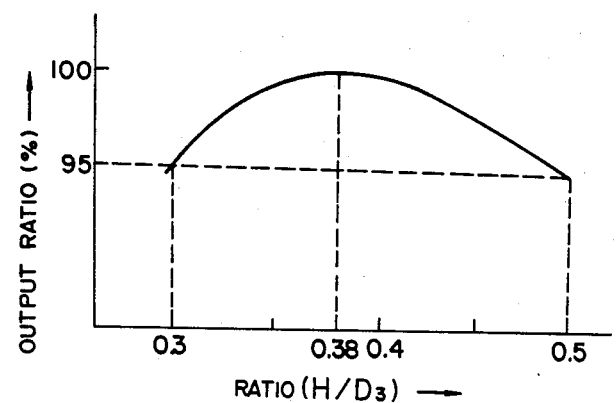

As to the relation between the ratio (H/$D_4$) of the depth H of the combustion chamber 32 to the maximum diameter $D_4$ of the second combustion chamber 48 and the output ratio, a maximum output is obtained at (H/$D_4$) of 0.38, and 95% to 100% of the maximum output is obtained at 0.3≦(H/$D_4$)≦0.5, as shown in FIG. 12. Therefore, the range of 0.3≦(H/$D_4$)≦0.5 is considered suitable.

Figure 13:
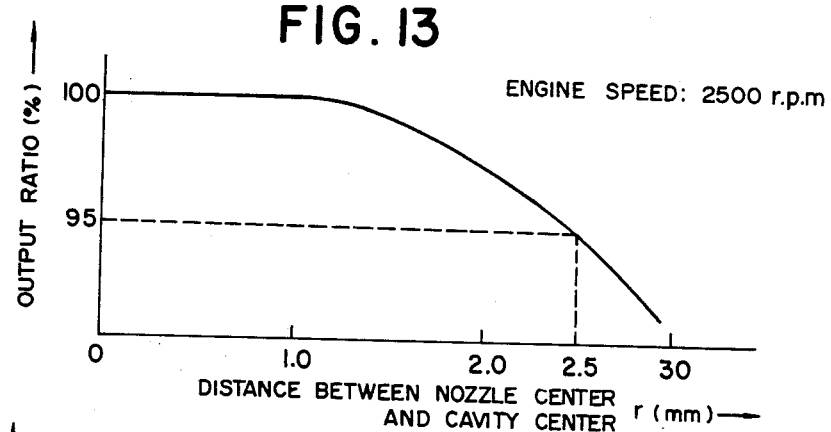

As to the relation of the distance, r, between a central position of the combustion chamber 32 and that of the injection nozzle 26 to the output ratio, it is seen from FIG. 13 that 95% to 100% of the maximum output is obtained at r≦2.5 mm at 2,500 rpm which is within the normal rotation range of the engine. Therefore, the range of r≦2.5 mm is considered appropriate.

Figure 14:
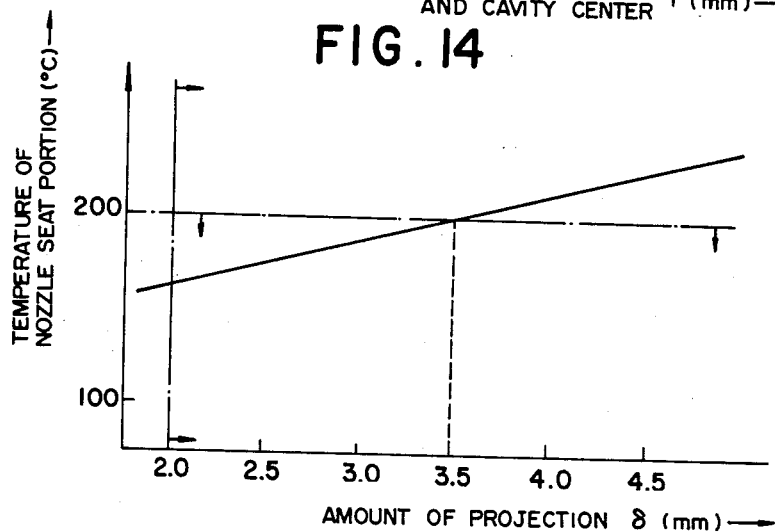

Further, in order to study the amount of projection, δ, of the injection nozzle 26 from the lower surface of the cylinder head 22, the present inventor has actually examined the relation between the amount of nozzle projection, δ, and the temperature of the nozzle seat portion, and obtained such results as shown in FIG. 14.

Generally, in order to avoid a bad influence of heat upon the injection nozzle 26, it is necessary that the temperature of the nozzle seat portion be set at not higher than 200° C., so δ≦3.5 mm is preferable as seen from FIG. 14. Further, where the amount of nozzle projection, δ, is close to zero, it is necessary to set δ≧2.0 mm to avoid inconveniences, e.g. direct adhesion of fuel to the lower wall face of the cylinder head 22. When these are taken into account, the range of 2.0 mm≦δ≦3.5 mm is considered appropriate.

Figure 15:
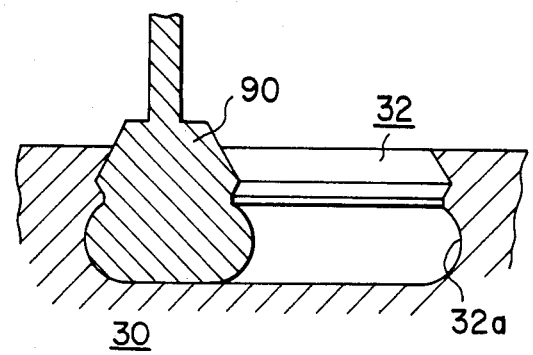
FIG. 15 is an explanatory view forming the structure of the first embodiment.

It has been confirmed by the present inventors' experiment that when the amount of projection, δ, of the injection nozzle 26 is set in the range of 2.0 mm≦δ≦3.5 mm, there are attained such functions and effects as explained previously in connection with FIGS. 8(a) to 8(c). It has also been confirmed by the present inventors' experiment that the following ranges of $R_1$ and $R_2$ are suitable: 0.3 mm≦$R_1$≦1.0 mm, 0.3 mm≦$R_2$23 1.0 mm In this embodiment, moreover, since the side wall 32a of the combustion chamber 32 is formed in the shape of a geometric rotating body, the combustion chamber can be finished extremely easily by rotating such a rotary cutter 90 as shown in FIG. 15 in conjunction with rotation about the central axis lo of the combustion chamber.

A second embodiment will be explained below with reference to FIGS. 16 to 21. In the construction of the second embodiment, portions which are substantially the same as in the construction of the first embodiment will be indicated by the same reference numerals and their explanations will be omitted.

The diesel engine in this embodiment is a small-sized direct injection type diesel engine having a displacement of 300 cc to 800 cc per cylinder like that in the first embodiment.

Figure 16:
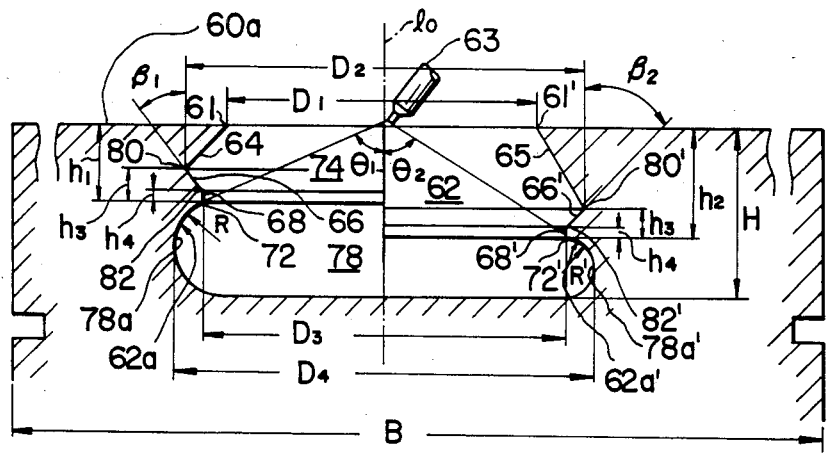
FIGS. 16 and 17 are longitudinal sectional views of a second embodiment of the present invention.

The construction of this embodiment is shown in FIG. 16, in which a piston 60 is provided at an upper portion thereof with a combustion chamber 62 which opens to a top part (top face) 60a of the piston, and a fuel injection nozzle 63 is disposed near a central axis lo of the combustion chamber 62. The combustion chamber 62 has a side wall composed of four side wall portions or transversely divided vertical sections, the number of which is the same as the number of spout orifices (four in this embodiment) of the injection nozzle 63. More specifically, the side wall of the combustion chamber 62 comprises first and second side wall portions 62a and 62a' which are arranged alternately or equi-angular-distantly at every 90° in the circumferential direction. The first and second side wall portions 62a and 62a' have a longitudinal sectional shape, namely, a segment surface of geometrically coaxially rotating bodies which is basically about the same as that of the side wall 32a of the combustion chamber 32 in the first embodiment.

The first side wall portion 62a includes a first guide wall portion 64 which becomes larger in inside diameter downwardly from an opening edge portion 61 of the top part 60a of the piston 60, a first fuel reflection wall 66 connected below the first guide wall 64 through a first connection 80 and formed so that its inside diameter becomes smaller downwards, and a rectilinear second fuel reflection wall 68 connected below the first fuel reflection wall 66 through a second connection 82 and formed approximately in parallel with the central axis lo.

The first guide wall 64 and the first fuel reflection wall 66 are formed in a shape which corresponds to a part of a side face of a truncated cone, while the second fuel reflection wall or segmented intermediate section 68 is formed in a shape which corresponds to a part of a side face of a column.

The first side wall portion 62a is further formed with a first lower side wall 78a connected below the second fuel reflection wall 68 and having an upper arcuate portion of radius R. An edge portion 72 is formed at the junction between the second fuel reflection wall 68 and the first lower side wall 78a.

The second side wall portion 62a' adjacent to the first side wall portion 62a includes, like the first side wall portion 62a, a second guide wall 65 which becomes larger in inside diameter downwardly from an opening edge portion 61' of the top part 60a of the piston 60, a third fuel reflection wall 66' connected below the second guide wall 65 through a third connection 80' and formed so that its inside diameter becomes smaller downwards, and a rectilinear fourth fuel reflection wall or segmented intermediate section 68' connected below the third fuel reflection wall 66' through a fourth connection 82' and formed approximately in parallel with the central axis lo.

The second guide wall 65 and the third fuel reflection wall 66' are formed in a shape which corresponds to a part of a side face of a truncated cone, while the fourth fuel reflection wall 68' is formed in a shape which corresponds to a part of a side face of a column.

The second side wall portion 62a' further includes a second lower side wall 78a' connected below the fourth fuel reflection wall 68' and having an arcuate upper portion of radius R'. An edge portion 72' is formed at the junction between the fourth fuel reflection wall 68' and the second lower side wall 78a'.

A first combustion chamber 74 is composed of the first guide wall 64, first connection 80, first fuel reflection wall 66, second connection 82, second fuel reflection wall 68, second guide wall 65, third connection 80', third fuel reflection wall 66', fourth connection 82' and fourth fuel reflection wall 68 and a second combustion chamber 78 is formed surroundingly by the first lower side wall 78a, second lower side wall 78a' and bottom 62b.

In the first and second side wall portions 62a and 62a', the radius (distance from the central axis lo) of the opening edge portion 61 of the top part 60a and that of the opening edge portion 61' of the top part 60a are equal to each other, and a diameter $D_1$ is constituted by these radii. Likewise, the radius (inside diameter) of the first connection 80 and that of third connection 80' are equal, and a diameter $D_2$ is constituted by these radii. Moreover, the radius (inside diameter) of the second fuel reflection wall 68 and that of the fourth fuel reflection wall 68' are equal, and a diameter $D_3$ is constituted by these radii. Further, the maximum radius of the first lower side wall 78a and that of the second lower side wall 78a' are equal, and a diameter $D_4$ is constituted by these radii.

Figure 17:
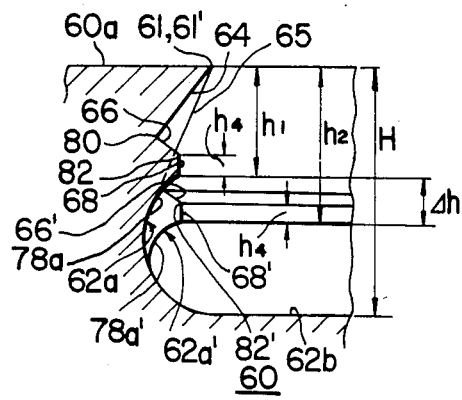

The angle $\beta_1$ between the first fuel reflection wall 66 of the first side wall portion 62a and the central axis lo is almost equal to the angle $\beta_2$ between the third fuel reflection wall 66' of the second side wall portion 62a' and the central axis lo. The depth $h_1$ from the top part 60a of the combustion chamber 62 to the edge portion 72 of the first side wall portion 62a is smaller than the depth $h_2$ from the above top part 60a to the edge portion 72' of the second side wall portion 62a'. The height $h_3$ from an upper edge (the first connection 80) of the first fuel reflection wall 66 of the first side wall portion 62a to a lower edge (edge portion 72) of the second fuel reflection wall 68 is the same as the height from an upper edge (third connection 80') of the third fuel reflection wall 66' of the second side wall portion 62a' to a lower edge (edge portion 72') of the fourth fuel reflection wall 68'. The length (height) of the second fuel reflection wall 68 of the first side wall portion 62a and that of the fourth fuel reflection wall 68' of the second side wall portion 62a' are set at the same length (height) $h_4$. Further, a circumferential connection between the edge portion 72 of the first side wall portion 62a and the edge portion 72' of the second side wall portion 62a' has a difference in height, $\Delta h$, as shown in FIG. 17.

Figure 18:
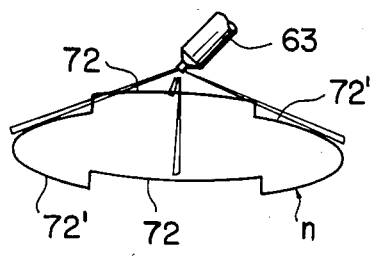
FIG. 18 is a conceptual diagram explanatory of fuel spraying directions in the second embodiment.

The injection nozzle 63 is fixed to the cylinder head 22 and its spout orifices are formed so that fuel is injected at angles $\theta_1$ and $\theta_2$ relative to the central axis lo. FIG. 18 shows a relation of the injection nozzle 63 relative to a line "n" which connects the edge portion 72 and 72' in the circumferential direction. As shown in this figure, the jets nozzle 63 is disposed so that fuel injections from the nozzle strike against the second and fourth fuel reflection walls 68 and 68' positioned above the edge portion 72 and 72' in the vicinity of the top dead center of the piston.

Among the diameter B of the piston 60, diameter $D_1$ of the upper opening edge portions 61 and 61' of the first combustion chamber 74, maximum diameter $D_2$ of the first combustion chamber 74, diameter $D_3$ of the edge portions 72 and 72' maximum diameter $D_4$ of the second combustion chamber 78, depth H of the combustion chamber 62, depth $h_1$ of the edge portion 72 of the first side wall portion 62a', depth $h_2$ of the edge portion 72' of the second side wall portion 62a', height $h_3$ as a total height of both the first and second fuel reflection walls 66 and 68, and height $h_4$ of the second fuel reflection wall 68, there exist the following relationships:

$D_4/B = 0.50$, $D_3/D_4 = 0.90$, $D_2/D_4 = 0.95$, $D_1/D_4 = 0.85$, $H/D_4 = 0.40$, $h_1/D_4 = 0.40$, $h_2/D_4 = 0.60$, $h_3/D_4 = 0.15$, $h_4/D_4 = 0.075$

Further, the injection angle $\theta_1$ of the injection nozzle 63 toward the first side wall portion 62a relative to the central axis lo, the injection angle $\theta_2$ toward the second side wall portion 62a', the angle $\beta_1$ between the first fuel reflection wall 66 and the central axis lo and the angle $\beta_2$ between the third fuel reflection wall 66' and the central axis lo, are as follows:

$\theta_1 = 75°$, $\theta_2 = 65°$, $\beta_1 = 50°$, $\beta_2 = 50°$

Figure 19:
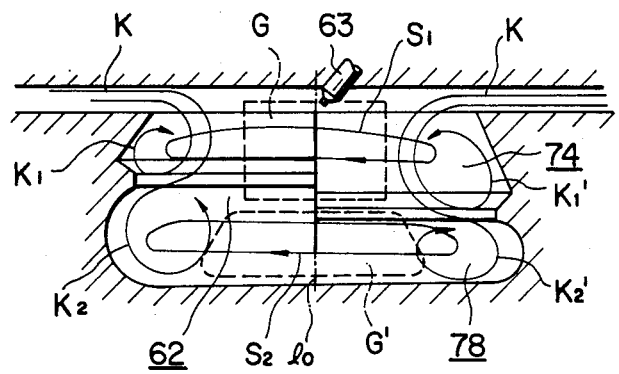
FIGS. 19, 20(a), 20(b) and 20(c) are explanatory views of fuel and air flows in the second embodiment.

According to the above construction of the second embodiment, when the piston 30 goes up within the cylinder 28 and reaches its top dead center or thereabouts, the squish K and K' are created strongly from the circumference of the combustion chamber 62 toward the interior of the same chamber as shown in FIG. 19.

Since the squish K and $K_2'$ try to concentrate toward a central part of the combustion chamber 62, a high pressure portion G is created at the central part. The downwardly moving squish K after striking against the high pressure portion G is guided by the first and third fuel reflection walls 66, 66' and the first and second guide walls 64, 65 and creates vertical rotating air flows $K_1$ and $K_1'$ in the first combustion chamber 74. The portion under the high pressure portion G also becomes higher in pressure than the surrounding portion in the combustion chamber to form a quasi-high pressure portion G'. Therefore, the main flow of the squish K moves down between the vertical rotating flows $K_1$, $K_1'$ and the high pressure portion G and is then forced out to the peripheral wall portion of the combustion chamber 62 and creates the vertical rotating flows $K_2$ and $K_2'$ as shown in FIG. 19.

Further, swirls $S_1$ and $S_2$ as shown in FIG. 19 are created in the combustion chamber 62 in addition to the squish K, K' and vertical rotating flows $K_1$, $K_1'$, $K_2$, $K_2'$. These air flows are mixed, so the combustion chamber 62 becomes filled with compressed air.

Figure 20A:
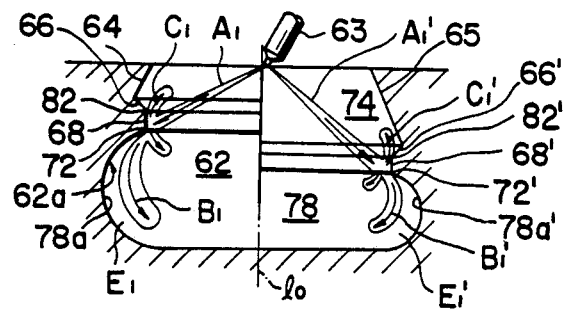

In a high load state (a state of long fuel spraying time) of the engine, fuel begins to be injected by the injection nozzle 63 into the combustion chamber 62 which is in such a state as described above, and it strikes against the peripheral wall of the combustion chamber 62 as shown in FIG. 20(a). Then, the piston 60 begins to go down and the state of the combustion chamber shifts to the one shown in FIG. 20(b), and in the state of FIG. 20(c) the fuel injection from the injection nozzle 63 is completed.

First, as shown in FIG. 20(a), when the injection of fuel is started and the injected fuel strikes against the peripheral wall of the combustion chamber 62, a main flow $A_1$ of the injected fuel strikes against the portion from the edge portion 72 to the second fuel reflection wall 68. The main flow of the injected fuel which has struck against the second fuel reflection wall 68 moves downward along the second fuel reflection wall 68. Then, at the edge portion 72, it leaves the first lower side wall 78a of the second combustion chamber 78 and creates a fuel flow $B_1$ which moves through the compressed air toward a central portion in the second combustion chamber 78 by the vertical rotating flow $K_2$. Further, an air layer $E_1$ defined by the fuel flow $B_1$ is created between the fuel flow $B_1$ and the first lower side wall 78a of the second combustion chamber 78.

Part of the fuel reflected by the second fuel reflection wall 68 becomes a flow $C_1$ moving upward in the first combustion chamber 74 as shown in FIG. 20(a) and it is moved upward by the vertical rotating flow $K_1$.

Also as to the second side wall portion 62a', there are performed about the same fuel reflection and diffusion as in the case of the first side wall portion 62a. As shown in FIG. 20(a), a main flow $A_1'$ of fuel injected from the injection nozzle 63 is reflected by the fourth fuel reflection wall 68', then moves downward and creates a fuel flow $B_1'$ which moves from the edge portion 72' toward the central portion of the second combustion chamber 78 and a fuel flow $C_1'$ which moves toward the center of the first combustion chamber 74. Further an air layer $E_1'$ is formed between the fuel flow $B_1'$ and the second lower side wall 78a'.

In the construction of this embodiment, moreover, since the edge portions 72 and 72' are formed on different levels, having a difference in height, $\Delta h$, the fuel flow $B_1'$ which has moved to the central portion of the combustion chamber 62 gets in below the fuel flow $B_1$, while the fuel flow $C_1$ is moved toward the central axis lo by the first guide wall 64, and the fuel flow $C_1'$ is reflected by the second guide wall 65 and also moves toward the axis lo. But, since the first guide wall 64 is at a larger angle to the central axis lo than the second guide wall 65, the portion where the fuel flow $C_1$ strikes against the first guide wall 64 is positioned above the portion where the fuel flow $C_1'$ strikes against the second guide wall 65, and therefore the fuel flow $C_1$ is positioned above the fuel flow $C_1'$ in the first combustion chamber 74.

The fuel flows $B_1$, $B_1'$, $C_1$ and $C_1'$ are spread in the combustion chamber 62 by the swirls $S_1$ and $S_2$ swirling about the axis lo, whereby air and fuel are distributed in a laminar form.

Figure 20B:
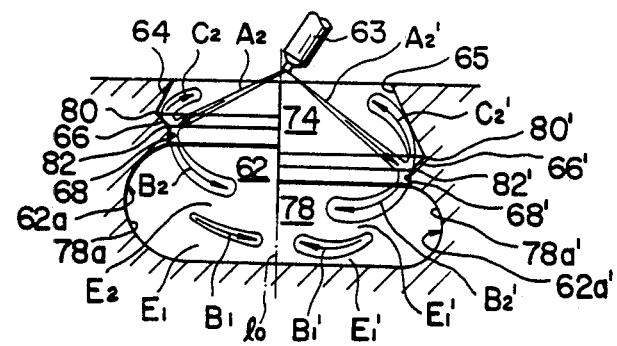

When the piston 60 moves down slightly from its top dead center and a main flow $A_2$ of fuel injected from the injection nozzle 63 strikes against the portion from the second fuel reflection wall 68 to the second connection 82, as shown in FIG. 20(b), the main flow of fuel reflected by the second fuel reflection wall 68 moves toward a central portion of the second combustion chamber 78 and flows in the direction of $B_2$ in the figure through the quasi-high pressure portion G'. Consequently, the fuel flow $B_2$ moves toward the axis lo in a position higher than the fuel flow $B_1$ which has been explained in connection with FIG. 20(a), and an air layer $E_2$ is formed between the fuel flows $B_2$ and $B_1$. Thus, in the second combustion chamber 78, there are formed the air layer $E_2$ and fuel flow $B_2$ in addition to the air layer $E_1$ and fuel flow $B_1$ which have been explained in connection with FIG. 20(a).

The fuel reflected by the second connection 82 flows upward along the first fuel reflection wall 66 by virtue of the injection energy, then strikes against a lower portion of the first guide wall 64 and is reflected thereby and moves through the high pressure portion G toward the central axis lo to form a fuel flow $C_2$.

In the construction of this embodiment, moreover, fuel flows $B_1'$, $B_2'$, $C_1'$ and $C_2'$ are also created at the second side wall portion 62a', and the fuel flows are vertically spaced from the fuel flows $B_1$, $B_2$, $C_1$ and $C_2$ at the first side wall portion 62a. Besides, the swirls $S_1$ and $S_2$ are formed in the combustion chamber 62. Consequently, air and fuel are distributed more minutely in a laminar form like that explained in connection with FIG. 20(a).

Figure 20C:
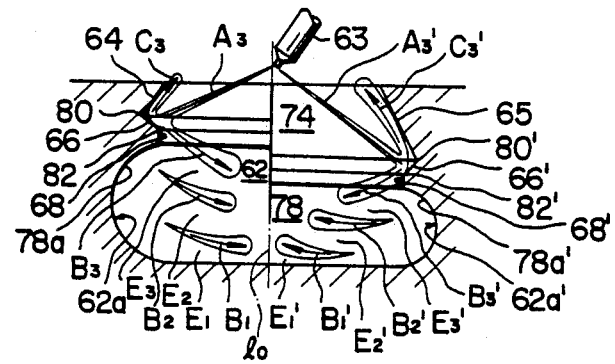

When the piston 60 descends to a further extend and a main flow $A_3$ of fuel injected from the injection nozzle 63 strikes mainly against the portion from the first fuel reflection wall 66 to the first connection 80, as shown in FIG. 20(c), the main flow of fuel reflected by the first fuel reflection wall 66 moves from the second connection 82 through the quasi-high pressure portion G' toward an upper central part of the second combustion chamber 78 in the direction of $B_3$ in the figure and there is formed an air layer $E_3$ between the fuel flow $B_3$ and $B_2$. Thus, in the second combustion chamber 78, there are formed the air layer $E_3$ and fuel flow $B_3$ in addition to the air layer $E_1$, fuel flow $B_1$, air layer $E_2$ and fuel flow $B_2$ which have been explained in connection with FIGS. 20(a) and 20(b).

Fuel flow $C_3$ which has struck against the first connection 80 moves along the first guide wall 64 toward the cylinder portion above the combustion chamber 62, and thus the fuel flow $C_3$ is created together with the fuel flows $C_1$ and $C_2$ which have been explained in connection with FIGS. 20(a) and 20(b).

In the construction of this embodiment, moreover, also at the second side wall portion 62a' of the combustion chamber 62, there are formed fuel flows $B_1'$, $B_2'$, $B_3'$, $C_1'$, $C_2'$ and $C_3'$ almost similarly to those at the first side wall portion 62a. Since they are vertically spaced from the fuel flows $B_1$, $B_2$, $B_3$, $C_1$, $C_2$ and $C_3$ at the first side wall portion 62a, the fuel flows in question and the air in the combustion chamber 62 are distributed extremely minutely in a laminar form by the swirls $S_1$ and $S_2$ in the same chamber.

In a medium load condition of the engine, fuel begins to be injected by the injection nozzle 63 into the combustion chamber 62 filled with compressed air as explained in connection with FIG. 19, and it strikes against the first and second side wall portions 62a and 62a' of the combustion chamber 62 as shown in FIG. 20(a), then the piston 60 descends to a further extent, and the fuel spraying from the injection nozzle 63 can be effected in the state of FIG. 20(b). The operation in the states of FIGS. 20(a) and 20(b) are about the same as those in the states of those figures at the time of high load previously noted.

Further, in a low load condition of the engine, it can be considered that the fuel spraying is completed in a state in which fuel strikes against the first and second side wall portions 62a and 62a' as shown in FIG. 20(a) in the combustion chamber 62 filled with compressed air as have been explained in connection with FIG. 19.

The operation in the state of FIG. 20(a) is about the same as that in the state of the same figure at the time of high load previously described.

Thus, in this second embodiment, during low, medium and high load conditions of the engine, air and fuel are distributed extremely minutely in a laminar form as has been explained in connection with FIGS. 20(a), 20(b) and 20(c), and both are fully mixed up by the action of the squish K, vertical rotating flows $K_1$, $K_1'$, $K_2$, $K_2'$ and swirls $S_1$, $S_2$, whereby the concentration of discharged smoke can be decreased.

Moreover, by the action of the air layers $E_1$ and $E_1'$, the fuel flows $B_1$ and $B_1'$ are surrounded with air sufficiently without being cooled by the first and second lower side walls 78a and 78a', whereby the decrease in concentration of discharged smoke can be attained.

Further, in the state of FIG. 20(c), fuel or flame is forced out positively into the air in cylinder portion above the combustion chamber 62, so it is possible to compensate for shortage of air during a high load operation of the engine.

Fuel or flame flowing out from the combustion chamber 62 toward the cylinder portion is directed above the combustion chamber 62 by the first and second guide walls 64 and 65, so it can be prevented from flowing directly into the quench zone Q, and therefore, the increase of the concentration of discharged smoke can be prevented.

In the construction of this embodiment, moreover, as has been explained in connection with FIGS. 20(b) and 20(c), the sprayed fuel does not concentrate on the lower portion of the combustion chamber 62, but is distributed throughout the interior of the same chamber by the action of the first and third fuel reflection walls 66 and 66' whose inside diameters become smaller downwardly and also by the action of the edge portions 72 and 72', whereby the amount of projection δ of the injection nozzle 63 from the cylinder head 22 can be made small and hence the tip end portion of the nozzle is prevented from being exposed to elevated temperatures.

According to the present inventors' experiment, it has been found that by defining as follows the range of each numerical value mentioned above, the output is improved about 10% throughout the normal engine speed range (1000 rpm–4000 rpm) as compared with that in the construction of the foregoing first embodiment, provided the concentration of discharged smoke is kept constant.

The displacement per cylinder is 400 cc to 500 cc and the compression ratio is 18 to 19.

Figure 21:
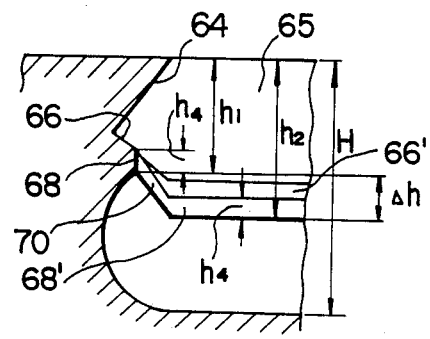
FIG. 21 is a longitudinal sectional view of a modification of the second embodiment.

$0.40 \leq D_4/B \leq 0.60$, $0.30 \leq H/D_4 \leq 0.50$, $0.85 \leq D_3/D_4 \leq 0.95$, $0.90 \leq D_2/D_4 \leq 1.00$, $0.80 \leq D_1/D_4 \leq 0.90$ (provided $D_1 \leq D_3 \leq D_2 \leq D_4$), $0.30 \leq h_1/D_4 \leq 0.50$, $0.50 \leq h_2/D_4 \leq 0.70$, $0.10 \leq h_3/D_4 \leq 0.30$, $0.03 \leq h_4/D_4 \leq 0.15$, $70° \leq \theta_1 \leq 80°$, $60° \leq \theta_2 \leq 70°$, $35° \leq \beta_1 \leq 65°$, $35° \leq \beta_2 \leq \gamma°$ Where, B: diameter of the piston 60
$D_1$: diameter of the upper edge portions 61 and 61' of the first combustion chamber 74
$D_2$: maximum diameter of the first combustion chamber 74 (diameter of the first and third connections 80 and 80')
$D_3$: diameter of the edge portions 72 and 72' (diameter of the second and fourth fuel reflection walls 68 and 68')
$D_4$: maximum diameter of the second combustion chamber 78
H: height of the combustion chamber 62
$h_1$: distance from the opening edge portion 61 of the combustion chamber 62 to the edge portion 72 of the first side wall portion 62a
$h_2$: distance from the opening edge portion 61' of the combustion chamber 62 to the edge portion 72' of the second side wall portion 62a'
$h_3$: total height of both the first and second fuel reflection walls 66 and 68 in the first side wall portion 62a (equal to the total height of both the third and fourth fuel reflection walls 66' and 68' in the second side wall portion 62a')
$h_4$: height of the second fuel reflection wall 68 in the first side wall portion 62a (equal to the height of the fourth fuel reflection wall 68' in the second side wall portion 62a')
$\theta_1$: injection angle toward the first side wall portion 62a relative to the central axis lo
$\theta_2$: injection angle toward the second side wall portion 62a' relative to the central axis lo
$\beta_1$: angle between the first fuel reflection wall 66 of the first side wall portion 62a and the central axis lo
$\beta_2$: angle between the third fuel reflection wall 66' of the second side wall portion 62a' and the central axis lo Although in this embodiment, the connection between the first and second side wall portions 62a and 62a' is so formed as to have difference in height as shown in FIG. 17, there may be formed a connection or transition section 70 which joins the first and second side wall portions 62a and 62a' smoothly and continuously as shown in FIG. 21, whereby the effect of the foregoing first embodiment can be further improved without weakening the flow velocity of the swirls $S_1$ and $S_2$.

A third embodiment of the present invention will be described below with reference to FIGS. 22 to 26, in which substantially same portions as in the first embodiment will be indicated by the same reference numerals and their detailed explanations will be omitted.

The diesel engine in this embodiment is a small-sized direct injection type diesel engine having a displacement of 300 cc to 800 cc per cylinder, almost similarly to that in the first and second embodiments.

Figure 22:
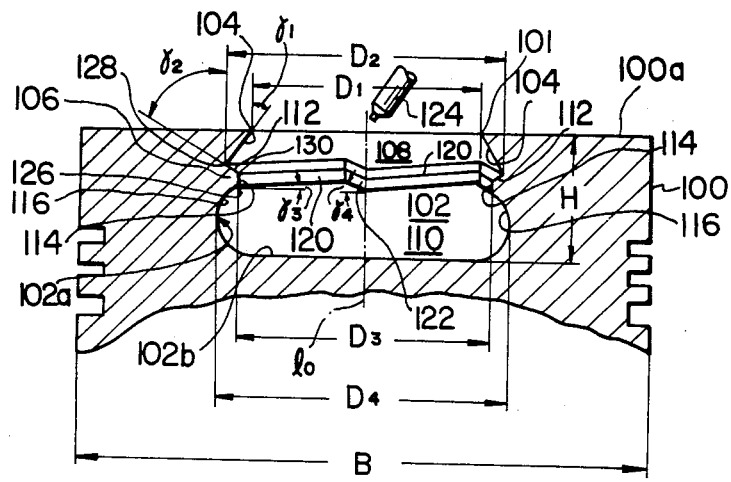
FIG. 22 is a longitudinal sectional view of a third embodiment of the present invention.

In the construction of this embodiment, as shown in FIG. 22 a combustion chamber 102 is formed as a recess in an upper portion of a piston 100 which opens to a top part (top face) 100a. At an upper portion of a side wall 102a of the combustion chamber 102, there is formed a guide wall 104 which is inclined by an angle of $\gamma_1$ relative to a central axis lo of the combustion chamber 102 so as to be divergent toward the interior of the piston 100. The lower end of the guide wall 104 of the side wall 102a of the combustion chamber 102 is connected through a first connection 128 to a ring-like projection (fuel reflecting wall portion) 106 projecting toward the inside of the combustion chamber 102 at an intermediate part in the vertical direction. The combustion chamber 102 is vertically divided by the projection 106 into a first combustion chamber 108 and a second combustion chamber 110.

An outer wall surface of the projection 106 is composed of a first fuel reflection wall 112 having an inclination angle $\gamma_2$ relative to the central axis lo of the combustion chamber 102 so as to become smaller in inside diameter downwardly, a second fuel reflection wall 114 connected below the first fuel reflection wall 112 through a second connection 130 and extending toward the central axis lo, and an upper wall surface 116 of the second combustion chamber 110 connected to the second fuel reflection wall 114.

The guide wall 104 and the first fuel reflection wall 112 are formed in the shape of a side face of a truncated cone, while the second fuel reflection wall 114 is formed in the shape of a side face of a column.

Below the second fuel reflection wall 114, a lower side wall 110a extends through an edge portion 126 up to a bottom 102b of the combustion chamber 102.

The projection 106 comprised of a plurality of intermediate segments is formed so that inclinedly the height from t bottom 102b of the combustion chamber 102 varies along the circumferential direction. Further, a first inclined portion 120 having an inclination angle $\gamma_3$ relative to a plane perpendicular to the central axis lo of the combustion chamber 102 and a second inclined portion 122 having an inclination angle $\gamma_4$ relative to the said perpendicular plane are formed alternately along the circumferential direction. The reference numeral 124 in the figures denotes an injection nozzle which is positioned near the central axis lo of the combustion chamber 102. The injection nozzle 124 is disposed so that in the vicinity of a top dead center of the piston 100 a fuel spray from the nozzle strikes against the upper wall surface 116 of the projection 106 in the second combustion chamber 110.

In this embodiment, a diameter B of the piston 100, diameter $D_1$ of an opening edge portion 101 of the first combustion chamber 108, maximum diameter $D_2$ of the first combustion chamber 108, inside diameter $D_3$ of the second fuel reflection wall 114, maximum diameter $D_4$ of the second combustion chamber 110 and depth H of the combustion chamber 102, are in the following relationships:

$D_4/B=0.5$, $H/D_4=0.4$, $D_3/D_4=0.90$, $D_2/D_4=0.95$, $D_1/D_4=0.85$

Further, the angle $\gamma_1$ of the guide wall 104 relative to the central axis lo, the angle $\gamma_2$ of the first fuel reflection wall 112 relative to the central axis lo, the angle $\gamma_3$ of the first inclined portion 120 of the projection 106 relative to a plane perpendicular to the central axis lo, and the angle $\gamma_4$ of the second inclined portion 122 of the projection 106 relative to a plane perpendicular to the central axis lo, are set as follows:

$\gamma_1=30°$, $\gamma_2=45°$, $\gamma_3=5°$, $\gamma_4=25°$

Figure 23:
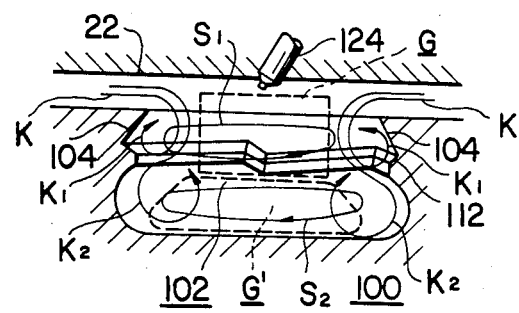
FIGS. 23, 24(a), 24(b), 24(c) and 25 are explanatory views of fuel and air flows in the third embodiment.

According to the construction of this embodiment, when the flow of air is considered in a state in which the piston 100 rises within the cylinder during a compression stroke of the engine and reaches near its top dead center, a strong squish K is created from the circumference of the combustion chamber 102 toward the interior thereof. The squish K tries to concentrate toward a central portion of the combustion chamber 102, so that a high pressure portion G is created at the central portion. The squish K moving downward after striking against the high pressure portion G is guided by the first fuel reflection wall 112 and the guide wall 104 and creates a vertical rotating flow $K_1$. The portion under the high pressure portion G also becomes higher in pressure than the surrounding portion in the combustion chamber and forms a quasi-high pressure portion $G'$. Consequently, a main flow of the squish K moves down between the vertical rotating flow $K_1$ and the high pressure portion G and is then forced out to the peripheral wall portion of the combustion chamber 102 by the quasi-high pressure portion $G'$ and creates such a vertical rotating flow $K_2$ as shown in FIG. 23. In the combustion chamber 102 there are created such swirls $S_1$ and $S_2$ as shown in FIG. 23 in addition to the squish K and vertical rotating flows $K_1$, $K_2$. In a mixed state of these air flows, compressed air is charged into the first and second combustion chambers 108 and 110.

Figure 24A:
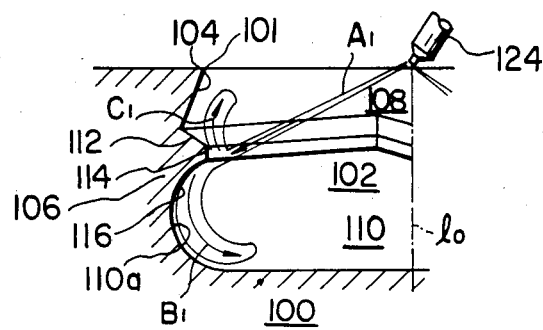
Figure 24B:
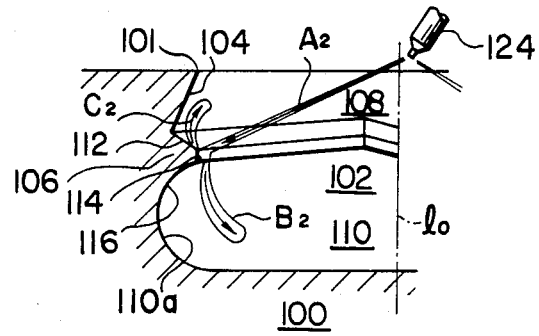

In a high load condition of the engine, fuel is sprayed into the combustion chamber 102 filled with compressed air as has been explained in connection with FIG. 23, and the piston begins to go down upon striking of fuel against the upper wall surface 116 of the second combustion chamber 110 shown in FIG. 24(a) and shifts to the state of FIG. 24(b), then it further descends, and it can be considered that in the state of FIG. 24(c) the fuel spraying from the injection nozzle 12 is completed.

Where a main flow $A_1$ of the injected fuel strikes against the upper wall surface 116 of the inner peripheral wall of the second combustion chamber 110, as shown in FIG. 24(a), the greater part of the fuel flow $A_1$, is guided by the inner peripheral wall (lower side wall) 110a of the second combustion chamber 110 and becomes a fuel flow $B_1$ moving toward a central portion of the second combustion chamber 110 under the action of the vertical rotating flow $K_2$. Fuel flow $C_1$ reflected upward by the projection 106 becomes a fuel flow moving toward a central portion of the first combustion chamber 108 under the action of the vertical rotating flow $K_1$.

Where the piston 100 descends, as shown in FIG. 24(b), a main flow $A_2$ of fuel injected from the injection nozzle 124 strikes against the second fuel reflection wall 114 because the nozzle 124 is positioned relatively higher than in the case of FIG. 24(a), and the fuel spray creates a fuel flow $B_2$ moving toward the central portion of the second combustion chamber 110 which flow $B_2$ moves above the fuel flow $B_1$ explained in connection with FIG. 24(a). The fuel spray which has struck against an upper portion of the second fuel reflection wall 114 is reflected at the first fuel reflection wall 112 and creates a fuel flow $C_2$ which is conducted to an upper central part of the first combustion chamber 108.

Figure 24C:
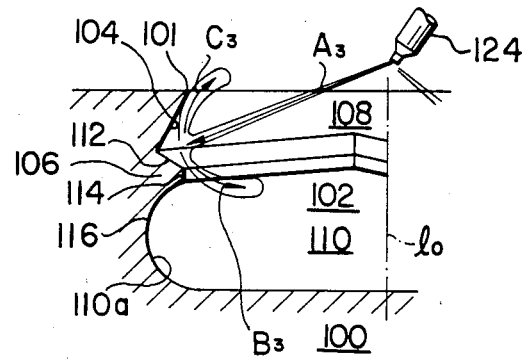

When the piston 100 further descends and a fuel spray $A_3$ injected from the injection nozzle 124 strikes against the first fuel reflection wall 112, as shown in FIG. 24(c), the fuel spray $A_3$ creates both a fuel flow $C_3$ which moves toward the cylinder portion above the combustion chamber 102 along the guide wall 104 and a fuel flow $B_3$ which moves toward an upper central part of the second combustion chamber 110.

The fuel spray from the injection nozzle 124 to be dispersed as mentioned above strikes against point X shown in FIG. 25 in a liquid state at the beginning of the injection, but once fuel is later made into fine particles, it is greatly influenced by the swirls $S_1$ and $S_2$ and is moved in the direction of arrow F in FIG. 25, so that the striking point gradually changes from point X to point Y.

In this connection, the striking points X and Y become different in vertical position with descent of the piston, so the height at which the fuel spray at each of the points X and Y is reflected and conducted or guided by the first and second inclined portions 120 and 122 varies with the lapse of time. Consequently, in the reflection of fuel spray, an action is made so that the height of the projection 106 in the combustion chamber 102 changes momentarily, and an action is created whereby the fuel which has struck against the side wall 102a of the combustion chamber 102 through the slopes of the first and second inclined portions 120 and 122 is rotated in a plane perpendicular to the central axis lo. Thus, the fuel spray dispersed by the projection 106 is fully dispersed and distributed over the other layers in the combustion chamber 102 by a cooperative action of the circumferentially inclined projection 106 and the swirls $S_1$ and $S_2$ in the combustion chamber 102. In this way, in each displacement of the piston 100, the fuel spray can be distributed over a plurality of upper, medium and lower layers in the combustion chamber 102 through the air swirls $S_1$ and $S_2$, whereby the mixing of air and fuel is performed sufficiently and the air utilization factor is increased.

Further, since the fuel spray is conducted toward the center of the combustion chamber 102 at every displacement of the piston 100, it becomes difficult for flame to spread toward the cylinder wall which is low in temperature even after firing, or quench zone Q.

Thus, a local formation of an overriched mixture in the combustion chamber 102 is avoided and it is possible to prevent flames from spouting to the quench zone Q during diffused combustion, whereby the amount of black smoke produced is decreased to a great extent and it becomes possible to improve the output which is restricted by the concentration of discharged smoke.

In a high load condition, as explained in connection with FIG. 24(c), fuel or flame flows out to the cylinder portion above the combustion chamber 102, whereby the air in the cylinder portion above the combustion chamber 102 can be utilized and it is thereby possible to compensate for the shortage of air.

In a medium load condition of the engine, fuel begins to be injected by the injection nozzle 124 into the combustion chamber 102 filled with compressed air as has been explained in connection with FIG. 25, and it strikes against the inner peripheral wall 110a of the second combustion chamber 110 as shown in FIG. 24(a), then the piston descends to a further extent and it can be considered that the fuel spraying from the injection nozzle 124 is completed in the state of FIG. 24(b). The operations in the states of FIGS. 24(a) and 24(b) are almost the same as those in the states of those figures in the high load condition described above.

In a low load condition of the engine, fuel strikes against the inner peripheral wall 110a of the second combustion chamber 110 as shown in FIG. 24(a) in the combustion chamber 102 filled with compressed air as has been explained in connection with FIG. 25, and it can be considered that the fuel spraying is completed in this state. The operation in the state of FIG. 24(a) is almost the same as that in the state of the same figure in the high load condition described above.

Thus, also in both low and medium load conditions of the engine, the fuel spray dispersed by the projection 106 is dispersed and distributed sufficiently over many layers in the combustion chamber 102 by a cooperative action of the swirls $S_1$, $S_2$ in the combustion chamber 102 and the circumferential slope of the projection 106, whereby the air utilization factor is increased and the concentration of discharged smoke can be decreased.

Figure 25:
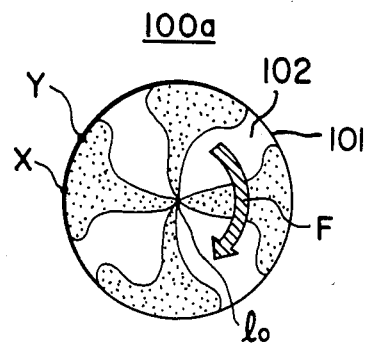
Figure 26:
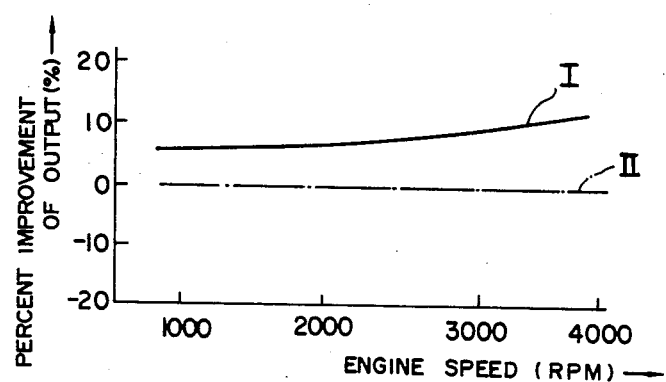
FIG. 26 is a graph showing the effect of the third embodiment.

FIG. 25 shows output characteristics in the case where the height of the projection 106 changes according to the structure of this embodiment, at the same concentration of discharged smoke as in the case where the height of the projection 106 is constant according to the structure of the first embodiment. In the combustion chamber structure of the present invention indicated by a solid line I, the output is improved about 5% to 10% as compared with the structure indicated by an alternate long and short dash line II.

According the present inventors' experiment, it has been found that by specifying as follows the range of each numeral value described previously, the output is improved about 5% at a constant value of the concentration of discharged smoke throughout the normal engine speed range (1000 rpm–4000 rpm) as compared with that in the construction of the first embodiment.

The displacement per cylinder is 400 cc to 500 cc and the compression ratio is 18 to 19.

$$0.4 \leq D_4/B \leq 0.6,$$

$$0.3 \leq H/D \leq 0.5,$$

$$0.85 \leq D_3/D_4 \leq 0.95,$$

$$0.9 \leq D_2/D_4 \leq 1.0,$$

$$0.8 \leq D_1/D_4 \leq 0.9 \text{ (provided } D_1 \leq D_3 \leq D_2 \leq D_4\text{)},$$

$$10° \leq \gamma_1 \leq 45°,$$

$$30° \leq \gamma_2 \leq 60°,$$

$$3° \leq \gamma_3 \leq 15° \text{ or } -3° \geq \gamma_3 \geq -15°,$$

$$12° \leq \gamma_4 \leq 80° \text{ or } -12° \geq \gamma_4 \geq -80°$$

Where,
- B: diameter of the piston 100
- $D_1$: diameter of the upper opening edge portion 101 of the first combustion chamber 108
- $D_2$: maximum diameter of the first combustion chamber 108
- $D_3$: inside diameter of the second fuel reflection wall 114
- $D_4$: maximum diameter of the second combustion chamber 110
- H: height of the combustion chamber 102
- $\gamma_1$: angle between the guide wall 104 and the central axis lo
- $\gamma_2$: angle between the first fuel reflection wall 112 and the central axis lo
- $\gamma_3$: angle between the first inclined portion 120 of the projection 106 and a plane perpendicular to the central axis lo γ4: angle between the second inclined portion 122 of the projection 106 and a plane perpendicular to the central axis lo According to this embodiment, moreover, it becomes possible to decrease the concentration of discharged smoke without projecting the injection nozzle 124 excessively into the combustion chamber 102, whereby a thermal deterioration in durability of the tip end of the injection nozzle 124 can be avoided.

The projection 106 may be intermittently projected circumferentially in a predetermined vertical position in the combustion chamber 102.

[Industrial Utilizability]

As set forth hereinabove, the present invention is applicable to a direct injection type diesel engine, particularly to a small-sized direct injection type diesel engine having a displacement of 300 cc to 800 cc per cylinder.

What is claimed is:

1. A combustion chamber structure in a diesel engine of a direct injection type having a cylinder block (20), a cylinder head (22) disposed above the cylinder block (20), a piston (30) fitted in a cylinder (28) of the cylinder block (20), a combustion chamber (32) which is formed as a recess in a top part (30a) of the piston (30) and whose upper surface is covered with the cylinder head (22), and a fuel injection nozzle (26) disposed in the cylinder head (22) for injecting fuel into the combustion chamber (32), characterized in that the combustion (32) is formed in the shape of a geometrical rotating body; that the combustion chamber (32) has a side wall (32a) and this side wall (32a) comprises a guide wall (34) which becomes larger in inside diameter downwardly from an opening edge portion (33) of the combustion chamber (32), a first fuel reflection wall (36) formed below the guide wall (34) so that it becomes smaller in inside diameter downwardly, a second fuel reflection wall (38) formed below the first fuel reflection wall (36) approximately in parallel with a central axis (lo) of the combustion chamber (32), and a lower side wall (48a) formed below the second fuel reflection wall (38), having a concavely curved shaped at its upper portion and connected at its lower portion to a bottom (32b) of the combustion chamber (32); that the combustion chamber (32) is composed of a first combustion chamber (44) surrounded by the guide wall (34), first fuel reflection wall (36) and second fuel reflection wall (38) and a second combustion chamber (48) formed below the first combustion chamber (44) and surrounded by the lower side wall (48a); and that spout orifices of the injection nozzle (26) are disposed so that in a top dead-center position of the piston (30), the fuel spray from the nozzle (26) is directed to a junction (42) between the first combustion chamber (44) and the second combustion chamber (48) and to the second fuel reflection wall (38) to cause the fuel spray to be reflected by the junction (42) and the second fuel reflection wall (38) into the first and second combustion chambers (44) and (48) so that the fuel spray is mixed with air in the first and second combustion chambers (46) and (48).

2. A combustion chamber structure in a diesel engine as set forth in claim 1, wherein the displacement per cylinder of the diesel engine is 300 cc to 800 cc.

3. A combustion chamber structure in a diesel engine as set forth in claim 1, wherein the second fuel reflection wall (38) is in the shape of a side face of a column.

4. A combustion chamber structure in a diesel engine as set forth in claim 1, wherein an upper portion of the lower side wall (48a) is in the shape of an arc in a longitudinal section through the central axis (lo) of the second combustion chamber (48).

5. A combustion chamber structure in a diesel engine as set forth in claim 1, wherein the junction (42) is in the shape of an edge.

6. A combustion chamber structure in a diesel engine as set forth in claim 1, wherein a diameter $D_1$ of the opening edge portion (33) of the first combustion chamber (32), a diameter $D_2$ of a first connection (50) between the guide wall (34) and the first fuel reflection wall (36), a diameter $D_3$ of the junction (42) and a maximum diameter $D_4$ of the second combustion chamber (48), are in the following relationship:

$$D_1 \leq D_3 \leq D_2 \leq D_4$$

and wherein the ratio $H/D_4$ of the depth H of the combustion chamber (32) to the maximum diameter $D_4$ of the second combustion chamber (48) is:

$$0.3 \leq H/D_4 \leq 0.5.$$

7. A combustion chamber structure in a diesel engine as set forth in claim 1, wherein the distance r between a central position of the first combustion chamber (44) and the center of the fuel injection nozzle (26) is set at $r \leq 2.5$ mm.

8. A combustion chamber structure in a diesel engine as set forth in claim 1, wherein the upper opening edge portion (33) of the guide wall (34) and a first connection (50) between the guide wall (34) and the first fuel reflection wall (36) are formed as arcs of the following radii $R_1$ and $R_2$ in a longitudinal section through the central axis (lo) of the first combustion chamber (44):

$$0.3 \text{ mm} \leq R_1 \leq 1.0 \text{ mm}, \ 0.3 \text{ mm} \leq R_2 \leq 1.0 \text{ mm}.$$

9. A combustion chamber structure in a diesel engine as set forth in claim 1, wherein the guide wall (34) is in the shape of a side face of a truncated cone.

10. A combustion chamber structure in a diesel engine as set forth in claim 9, wherein the angle α between the guide wall (34) and the central axis (lo) of the first combustion chamber (44) is $15° \geq \alpha \geq 45°$.

11. A combustion chamber structure in a diesel engine as set forth in claim 1, wherein the first fuel reflection wall (36) is in the shape of a side face of a truncated cone.

12. A combustion chamber structure in a diesel engine as set forth in claim 11, wherein the angle β between the first fuel reflection wall (36) and the central axis (lo) of the first combustion chamber (44) is $15° \geq \beta \geq 45°$.

13. A diesel engine of the direct injection type comprising: means defining at least one cylinder having a cylinder head thereon and an inlet portion for introducing air therein; a piston mounted to undergo reciprocatory movement within the cylinder and having a cavity therein defined by an inner wall of the piston, the inner wall having a top edge section facing the cylinder head to define the opening of the cavity, a bottom section opposing the cylinder head to define the bottom of the cavity, an upper section extending downwardly from the top edge section and tapering radially outwardly to define an upper combustion chamber in the cavity, a lower section extending upwardly from the bottom section and curving radially outwardly to define a lower combustion chamber in the cavity, and an intermediate section extending between the upper and lower sections and protruding radially inwardly to divide the upper and lower combustion chambers, the radial innermost portion of the intermediate section being substantially parallel to the axis of the piston to define a reflection wall; and means including an injection nozzle disposed on the inside of the cylinder head for directing a fuel spray against the reflection wall when the piston moves to top-dead-center position to cause the fuel spray to be reflected by the reflection wall and directed therefrom as separate fuel sprays into the upper and lower combustion chambers, respectively, for mixture with air in the upper and lower combustion chambers.

14. A diesel engine as set forth in claim 13; wherein the lower section has the shape of an arc.

15. A diesel engine as set forth in claim 13; wherein the intermediate section has the shape of a column.

16. A diesel engine as set forth in claim 13; wherein the displacement per cylinder of the diesel engine is 300 cc to 800 cc.

17. A diesel engine as set forth in claim 13; wherein the top edge section has the shape of an arc having a radius in the range of 0.3 mm to 1.0 mm.

18. A diesel engine as set forth in claim 13; wherein the injection nozzle protrudes downwardly from the cylinder head at a distance in the range of 2.0 mm to 3.5 mm.

19. A diesel engine as set forth in claim 13; wherein the intermediate section comprises a plurality of intermediate segments connected in series along the circumference of the cavity.

20. A diesel engine as set forth in claim 19; wherein the intermediate segments are inclined with respect to the bottom of the cavity.

21. A diesel engine as set forth in claim 20; wherein the adjacent intermediate segments are oppositely inclined relative to each other.

22. A diesel engine as set forth in claim 13; including control means for controlling the injection of the fuel spray injected by the injection nozzle in accordance with the load condition of the diesel engine.

23. A diesel engine as set forth in claim 22; wherein the control means includes means operative under relatively low load conditions to enable the injection nozzle to direct the fuel spray only along a lower portion of the reflection wall immediately after the piston reaches the top-dead-center position.

24. A diesel engine as set forth in claim 22; wherein the control means includes means operative under relatively medium load conditions to enable the injection nozzle to direct the fuel spray along substantially the entire portion of the reflection wall during the initial movement of the piston from the top-dead-center position.

25. A diesel engine as set forth in claim 22; wherein the control means includes means operative under relatively high load conditions to enable the injection nozzle to direct the fuel spray along the first-mentioned reflection wall and the other reflection wall adjacent thereto during the movement of the piston from the top-dead-center position.

26. A diesel engine as set forth in claim 13; wherein the cavity of the piston has the shape of a geometrical rotating body.

27. A diesel engine as set forth in claim 26; wherein the axis of the geometrical rotating body is deviated from the axis of the cylindrical piston.

28. A diesel engine as set forth in claim 26; wherein the injection nozzle is located at a distance less than 2.5 mm from the axis of the cavity.

29. A diesel engine as set forth in claim 26; wherein the top edge section has a diameter $D_1$, the upper section has a maximum diameter $D_2$, the intermediate section has a diameter $D_3$, and the lower section has a maximum diameter $D_4$ satisfying the relation $D_1 \leq D_3 \leq D_2 \leq D_4$, and the cavity has a depth H in the range of $0.3 \leq H/D_4 \leq 0.5$.

30. A diesel engine as set forth in claim 29; wherein the piston has an outer diameter B in the range of $0.4 \leq D_4/B \leq 0.6$.

31. A diesel engine as set forth in claim 13; wherein the inner wall comprises a plurality of vertical sections divided transversely from each other and extending upwardly from the bottom of the cavity.

32. A diesel engine as set forth in claim 31; wherein the inner wall comprises a certain number of the vertical sections corresponding to a number of spout orifices of the injection nozzle.

33. A diesel engine as set forth in claim 31; wherein the vertical sections comprise a segment surface of different geometrically coaxially rotating bodies.

34. A diesel engine as set forth in claim 33; wherein the vertical sections are disposed equi-angular-distantly around the axis of the cavity.

35. A diesel engine as set forth in claim 31; wherein the adjacent vertical sections have segmented intermediate sections respectively disposed at different depths from the top opening of the cavity.

36. A diesel engine as set forth in claim 35; including transition sections for continuously connecting the segmented intermediate sections.

37. A diesel engine as set forth in claim 13; wherein the upper section comprises an upper sub-section extending downwardly and radially outwardly from the top edge section to define a guide wall, and a lower sub-section extending upwardly and radially outwardly from the intermediate section to define another reflection wall contiguous to the first-mentioned reflection wall.

38. A diesel engine as set forth in claim 37; wherein said another reflection wall is shaped so that the fuel spray which impinges thereon and is reflected thereby into the upper and lower combustion chambers when the piston moves away from the vicinity of the cylinder head.

39. A diesel engine as set forth in claim 37; wherein the guide wall is shaped to restrict the flow of the reflected fuel spray within the upper combustion chambers.

40. A diesel engine as set forth in claim 37; including a border section dividing the upper and lower sub-sections, the border section having the shape of an arc having a radius in the range of 0.3 mm to 1.0 mm.

41. A diesel engine as set forth in claim 37; wherein the upper sub-section has the shape of a truncated cone.

42. A diesel engine as set forth in claim 41; wherein the upper sub-section has an inclination of 15° to 45° relative to the longitudinal axis of the piston.

43. A diesel engine as set forth in claim 37; wherein the lower sub-section has the shape of a truncated cone.

44. A diesel engine as set forth in claim 43; wherein the lower sub-section has an inclination of 15° to 45° relative to the longitudinal axis of the piston.

* * * * *